United States Patent
Hill

(12) 
(10) Patent No.: US 6,362,540 B1
(45) Date of Patent: Mar. 26, 2002

(54) EXPANDABLE HYBRID ELECTRIC GENERATOR AND METHOD THEREFOR

(75) Inventor: Bryan T. Hill, Glendale, AZ (US)

(73) Assignee: Pinnacle West Capital Corporation, Phoenix, AZ (US)

( * ) Notice: Subject to any disclaimer, the term of this patent is extended or adjusted under 35 U.S.C. 154(b) by 0 days.

(21) Appl. No.: 09/422,137

(22) Filed: Oct. 20, 1999

(51) Int. Cl.⁷ .................................................. H02J 1/00
(52) U.S. Cl. .......................................... 307/52; 307/24
(58) Field of Search ......................... 307/52–63, 31–35, 307/24, 66; 340/310; 363/71, 127

(56) References Cited

U.S. PATENT DOCUMENTS

| | | | |
|---|---|---|---|
| 4,899,129 A | * 2/1990 | MacFayden et al. | 340/310 R |
| 4,996,637 A | 2/1991 | Piechnick | 363/16 |
| 5,031,086 A | 7/1991 | Dhyanchand et al. | 363/37 |
| 5,225,712 A | 7/1993 | Erdman | 290/44 |
| 5,373,433 A | 12/1994 | Thomas | 363/43 |
| 5,515,264 A | 5/1996 | Stacey | 363/132 |
| 5,523,938 A | 6/1996 | Wagner et al. | 363/53 |
| 5,563,802 A | 10/1996 | Plahn et al. | 364/492 |
| 5,616,968 A | * 4/1997 | Fujii et al. | 307/66 |
| 5,734,255 A | 3/1998 | Thompson et al. | 322/7 |
| 5,754,033 A | 5/1998 | Thomson | 322/45 |
| 5,765,656 A | 6/1998 | Weaver | 180/65.3 |
| 5,798,633 A | 8/1998 | Larsen et al. | 323/207 |
| 5,892,664 A | 4/1999 | Vedder | 363/17 |
| 6,005,788 A | * 12/1999 | Lipo et al. | 363/65 |
| 6,115,276 A | * 9/2000 | Mao | 363/127 |
| 6,118,680 A | * 9/2000 | Wallace et al. | 363/71 |

* cited by examiner

*Primary Examiner*—Josie Ballato
*Assistant Examiner*—Sharon Polk
(74) *Attorney, Agent, or Firm*—Lowell W. Gresham; Jordan M. Meschkow; Meschkow & Gresham, P.L.C.

(57) ABSTRACT

An expandable hybrid electric generator (20) includes a number of power blocks (22) that may be nearly identical to one another. The power blocks (22) are controlled by a master controller (34), and an external supervisor (30) performs some master controller (34) functions should the master controller (34) fault. The power blocks (22) each include a battery bank (42) and an inverter/charger (44), both of which couple to a DC bus (40). The inverter (44) and an AC generator (50) couple to an AC bus (24). The DC busses (40) of the power blocks (22) remain independent of one another, but all power blocks (22) couple together at the AC bus (24). The master controller (34) issues instructions to the inverters (44) that maintain approximately equal states at the independent DC busses (40) of the power blocks (22).

32 Claims, 9 Drawing Sheets

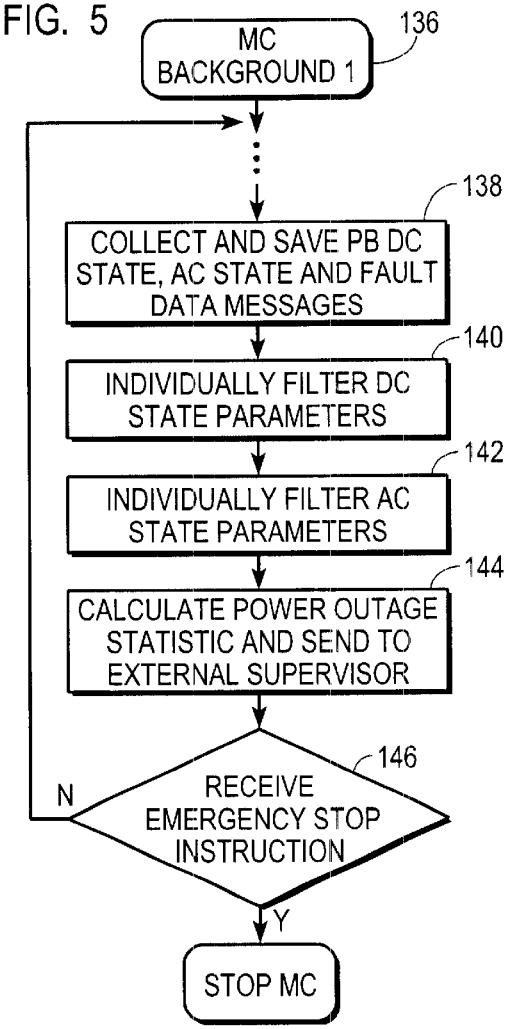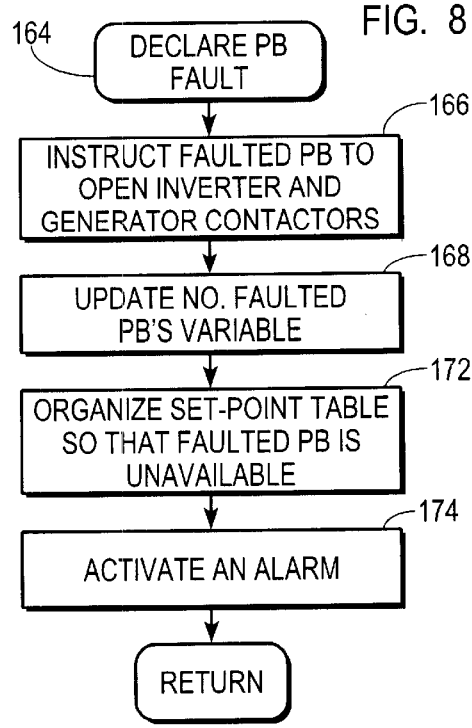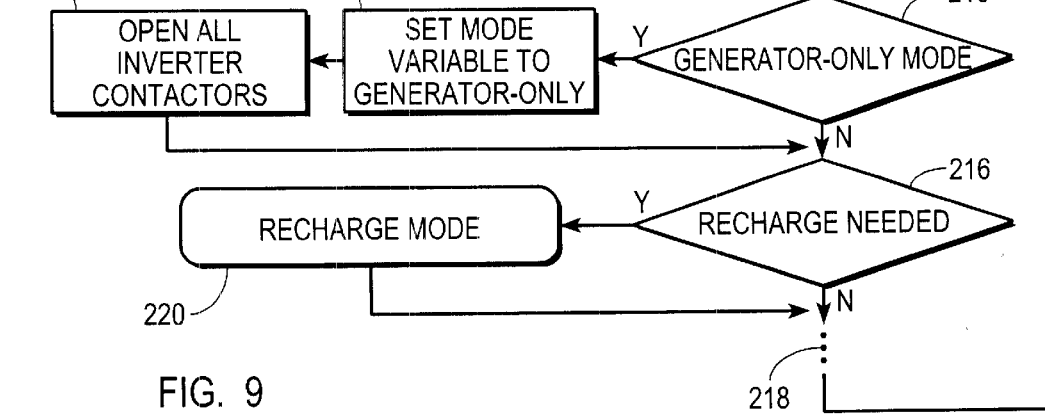
FIG. 5
FIG. 8
FIG. 9

EXPANDABLE HYBRID ELECTRIC GENERATOR AND METHOD THEREFOR

TECHNICAL FIELD OF THE INVENTION

This invention relates broadly to the generation of electricity and more specifically to the structure and operation of a hybrid electric generating system.

BACKGROUND OF THE INVENTION

Hybrid electric generating systems typically include AC and DC sources of electricity for driving an independent single phase or polyphase AC power grid. The DC sources of electricity typically include a battery bank, but may include other sources of DC energy. An inverter couples between the battery bank and the AC power grid to convert the DC electricity from the battery bank into AC electricity. An AC generator more directly couples to the AC power grid. The inverter often includes a battery charging section which occasionally converts power from the AC grid into DC for charging the battery bank.

The AC generator is typically a fossil-fueled device which exhibits a most efficient operating point, where the amount of electricity generated per unit of fuel consumed is greatest. A typical operating procedure for a hybrid electric generating system seeks to operate the AC generator only occasionally and under conditions where it can be operated efficiently. Accordingly, the AC generator will be brought on-line occasionally to drive the electrical load and concurrently charge the battery bank. However, when the battery bank is not due for a recharge and has sufficient charge capacity to drive the electrical load, the AC generator remains off-line and turned off.

Conventional hybrid electric generating systems suffer from an expendability problem. In order to achieve economies of scale, conventional hybrid electric generating systems are designed and built for a maximum capacity, worst case, situation which will not occur for many years. This approach demands the early outlay of an undesirably large amount of resources for which a corresponding income stream will not be available until much later. To make matters worse, this approach typically requires significant on-site construction to produce a one-of-a-kind installation. Moreover, reliability suffers due to a lack of redundancy. The reliability problem is exacerbated for hybrid electric generating systems because such systems are typically used in remote locations not serviced by a public electric power distribution grid which might otherwise serve a backup power source role. Due at least in part to this expandability problem, the usefulness of conventional hybrid electric generating systems is limited.

For example, if a new subdivision of fifty homes is planned for a remote area that is not currently connected to the public electric power distribution grid, a hybrid electric generating system with sufficient capacity to power those fifty homes might be a viable alternative to the expensive option of extending the public electric power distribution grid to that remote area. However, all fifty of the planned homes are not likely to come on-line at the same time, and those resources expended to have the entire fifty-home capacity available when the first homes need electricity are likely to be underutilized for several years. Moreover, no guarantee can be provided that the entire fifty homes will actually be built and occupied, or that a greater number of homes will not be eventually built and occupied. Furthermore, since the hybrid electric generating system might serve as an alternative to, and not a back-up for, or be backed-up by, the public electric power distribution grid, any reliability problem would be a serious concern.

Accordingly, a need exists for an expandable hybrid electric generating system which would allow electric power capacity to grow in an efficient manner with the need for power. Such an expandable hybrid electric generating system would lessen the early outlay of excessive resources, lessen the uncertainties associated with what actual capacity will be needed in the future, better balance the early outlay of resources with income streams, and be reliable.

On the other hand, a practical expandable hybrid electric generating system faces significant obstacles. For example, independent sources of DC electricity should be connected together through DC switchgear for protection and safety, but any significant quantity of such DC switchgear tends to be too expensive for a practical system. Independent hybrid electric generating modules could let DC sources operate independently from one another, but one module could then bear an undesirable share of the electrical load, causing its battery bank to experience an excessive number of charge cycles and an excessive battery replacement cost or its inverter to experience an excessive load and reduced reliability.

SUMMARY OF THE INVENTION

Accordingly, it is an advantage of the present invention that an improved expandable hybrid electric generating system and method are provided.

Another advantage is that a hybrid electric generating system with improved reliability is provided.

Another advantage is that an improved expandable hybrid electric generating system using only a small amount of DC switchgear is provided.

Another advantage is that an improved expandable hybrid electric generating system maintaining a plurality of independent DC busses is provided.

Another advantage is that an improved expandable hybrid electric generating system minimizing battery charge cycles is provided.

Another advantage is that an improved expandable hybrid electric generating system using nearly identical power block modules is provided.

Another advantage is that an improved expandable hybrid electric generating system which can be expanded and maintained with only a small amount of skilled labor cost is provided.

Another advantage is that an improved expandable hybrid electric generating system allows nearly identical power blocks to be built and tested at a manufacturing facility and deployed or returned as needed.

The above and other advantages of the present invention are carried out in one form by an expandable hybrid electric power generating system that includes an AC bus, a plurality of power blocks and a controller. The AC bus supplies electrical power to an electrical load. Each power block has a DC energy source coupled to a DC bus of the power block, an inverter coupled to the DC bus of the power block and to the AC bus, and a generator coupled to the AC bus. The controller is in communication with the power blocks. The controller provides instructions to the power blocks causing the power blocks to maintain approximately equal states of the DC busses within the power blocks.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 5 shows a flow chart of a first background process performed by a master controller portion of the expandable hybrid electric generating system of FIG. 1;

FIG. 8 shows a flow chart of a process performed by the master controller when power blocks experience faults;

FIG. 9 shows a flow chart of a foreground process performed by the master controller;

DETAILED DESCRIPTION OF THE PREFERRED EMBODIMENTS

Figure 1:
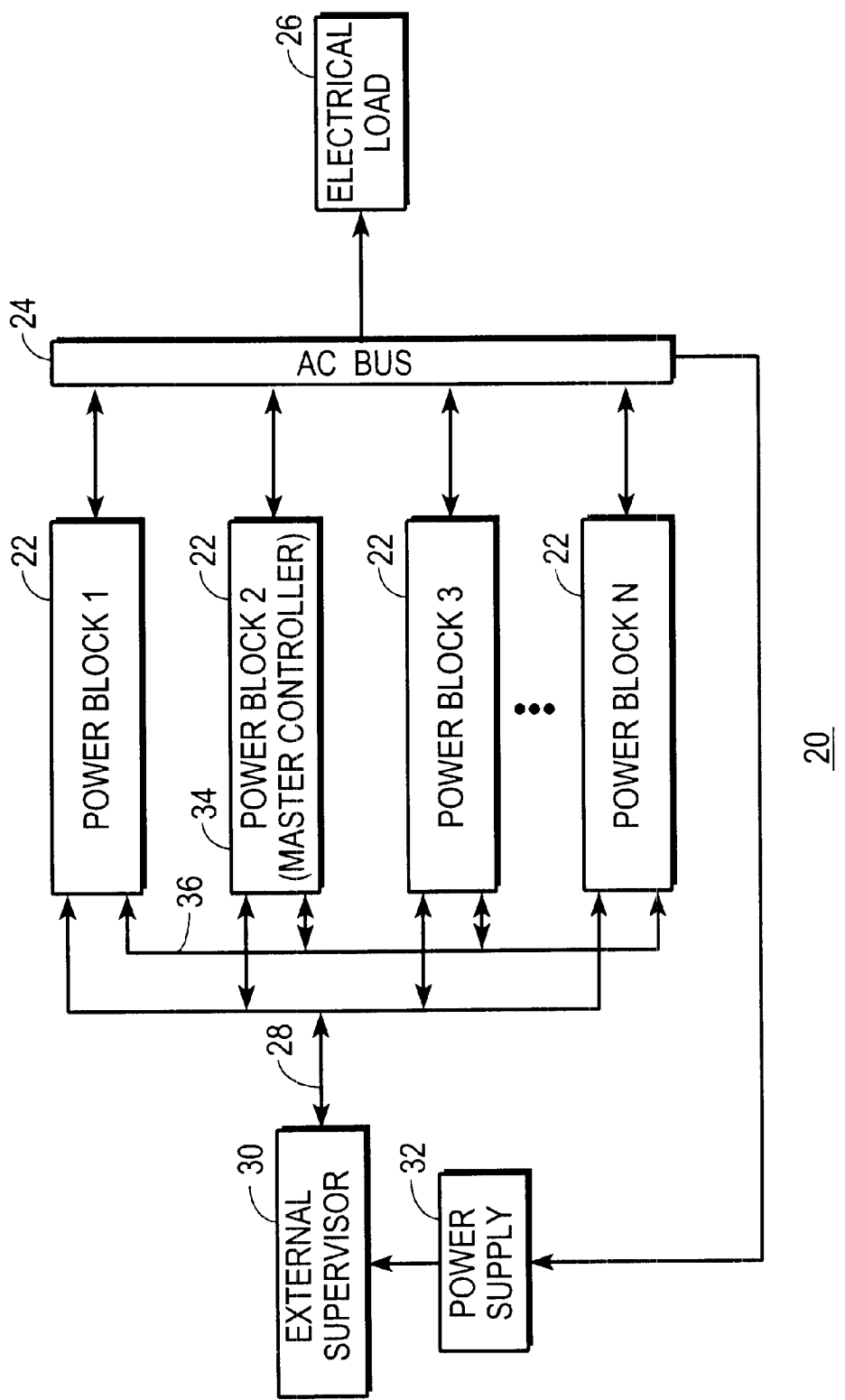
FIG. 1 shows a block diagram of an expandable hybrid electric generating system configured in accordance with a preferred embodiment of the present invention.

FIG. 1 shows a block diagram of an expandable hybrid electric generating system 20 configured in accordance with a preferred embodiment of the present invention. System 20 includes a plurality of power blocks 22, each of which couples to an AC power distribution grid or bus 24 that drives or otherwise supplies electricity to an electrical load 26. Electrical load 26 undergoes instantaneous changes as the equipment which makes up load 26 is turned on and off. As few as two or as many as any number of power blocks 22 may be included. Each power block 22 is in data communication through a first communication bus 28 with an external supervisor 30.

External supervisor 30 is energized by a power supply 32 which is preferably powered from AC bus 24 but has battery back-up. External supervisor 30 is configured as a computer, perhaps even as a personal computer, having a microprocessor, memory for storing software programming and operational data, timing circuits, I/O devices, and the like (not shown). In one embodiment, external supervisor 30 is equipped with a radio communication device (not shown) for communicating alarm messages to a remote monitoring facility (not shown).

In one preferred embodiment, one of power blocks 22 (e.g., power block "2") is designated as a master controller 34 which is in signal and data communication with that one power block 22 (e.g., power block "2"), and with all other power blocks 22 through a second communication bus 36. Master controller 34 may also communicate with external supervisor 30 through first communication bus 28. Master controller 34 is configured as a computer having a microprocessor, memory for storing software programming and operational data, timing circuits, I/O devices, and the like (not shown). In one embodiment, master controller 34 is also equipped with a radio communication device (not shown) for communicating alarm messages to a remote monitoring facility (not shown). Master controller 34 controls the operation of system 20. External supervisor 30 operates as a back-up controller which controls system 20 when a fault occurs in master controller 34.

While FIG. 1 depicts a configuration for one preferred embodiment of system 20, those skilled in the art will appreciate that many alternate preferred embodiments are likewise acceptable. For example, one alternate embodiment can use independent communication links between power blocks 22 and master controller 34 and/or between power blocks 22 and external supervisor 30. An alternate embodiment can provide a separate dedicated communication link between external supervisor 30 and master controller 34. Master controller 34 need not be associated with any single power block 22 and may be a stand-alone computer. Likewise, master controller 34, which performs a number of processes, may distribute those processes over a number of power blocks 22. In another alternate embodiment, external supervisor 30 may be associated with a specific power block 22, and such an external supervisor 30 may or may not have substantially the same functionality as master controller 34. These and other equivalent embodiments are intended to be included within the scope of the present invention.

While the electrical generating capacity of any single power block 22 is not a critical parameter of the present invention, a capacity of around 40 kW appears to provide certain benefits. Desirably, but not as a requirement, all power blocks 22 are nearly identical modules in configuration. This allows each power block 22 to be reliably and inexpensively manufactured and tested en masse at a factory remotely located from installation sites. Moreover, the amount of labor, particularly highly skilled labor, required on-site is reduced so the initial installation and upgrading of system 20 is relatively inexpensive.

Moreover, at a generating capacity of around 40 kW, a power block 22 can be easily and relatively inexpensively transported between the factory and an installation site for both initial installation and subsequent maintenance, if necessary. In a desirable, but not required, procedure for operating system 20, an enterprise may keep one or more spare power blocks 22 available for use in system 20 or other systems 20 should the need arise. When a power block 22 fault is detected, without taking system 20 off-line, that power block 22 may be replaced with the spare then shipped back to the factory if necessary for repairs. Reliability is achieved relatively inexpensively.

Figure 2:
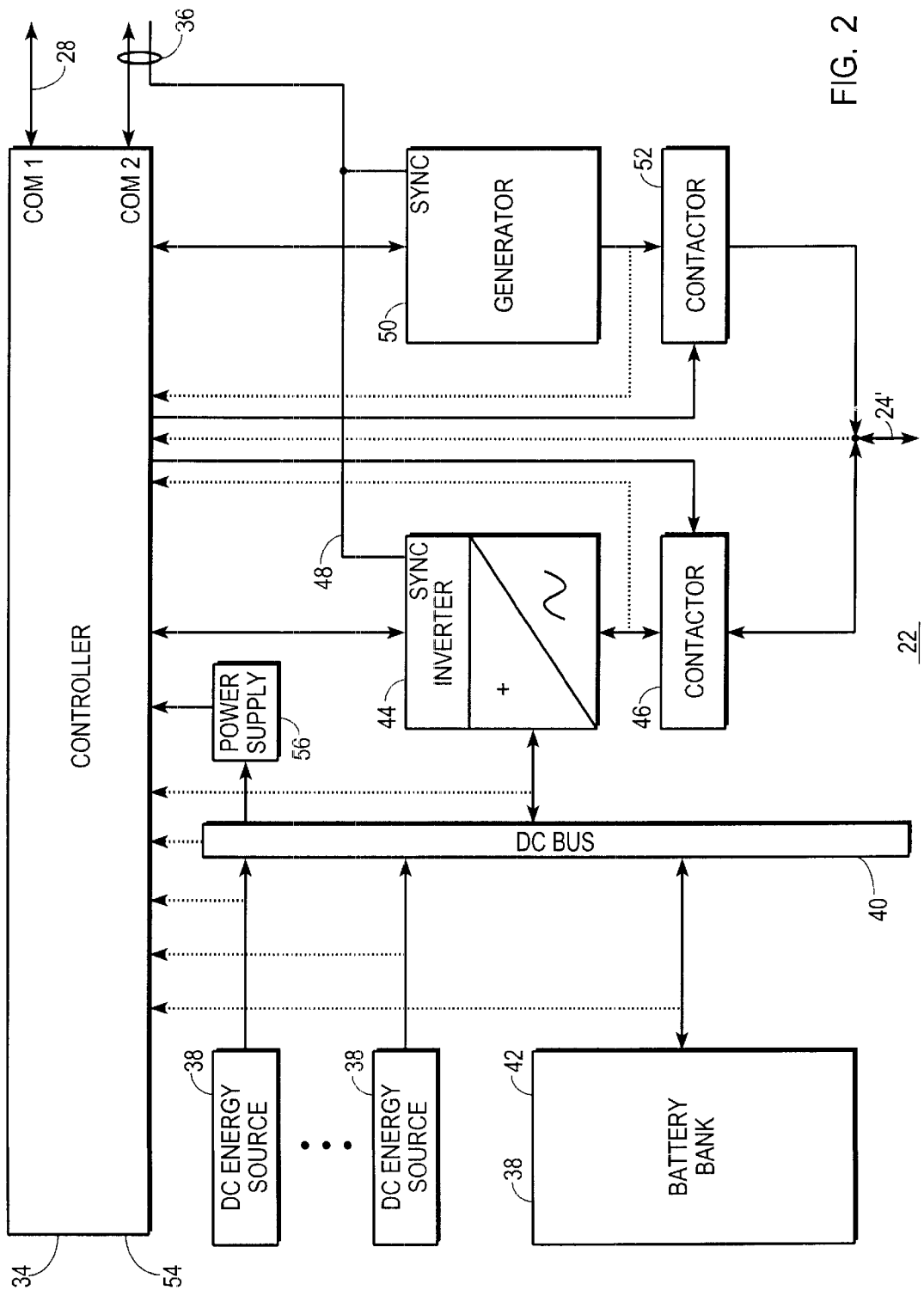
FIG. 2 shows a block diagram of a preferred embodiment of a power block portion of the expandable hybrid electric generating system of FIG. 1.

FIG. 2 shows a block diagram of a preferred embodiment of a power block 22. Power block 22 includes any number of DC energy sources 38, each of which couples to a DC power distribution bus 40. DC energy sources 38 may be photo voltaic arrays, wind turbines, fueled DC generators, DC micro turbines, AC micro turbines which drive rectifiers, fuel cells, batteries, and the like, along with any voltage regulation and isolation or protection circuits that may be desirable. A battery bank 42, which includes any number of individual batteries in any desirable series/parallel coupling configuration along with any desirable isolation or protection circuits, is specifically depicted in FIG. 2 as coupling to DC bus 40. In one alternate embodiment, however, fuel cells or micro turbines drive DC bus 40 without requiring the presence of battery bank 42.

An inverter/charger 44 (hereinafter simply "inverter 44"), has a DC port which also couples to DC bus 40. A contactor 46 couples between an AC port of inverter 44 and AC bus 24 (FIG. 1) through an AC port 24I. In the preferred embodiment, inverter 44 is a conventional bi-modal inverter which converts DC power into AC power and vice-versa. Such an inverter typically includes many high power semiconductor switching devices, such as IGBTs or FETs, in bridge configurations and controls the phase and/or a pulse width modulation of the switching devices to alter the amount of power flowing in a selected direction. Inverter 44 instantaneously alters switching points of the switching devices so that the power flow matches instantaneous changes in electrical load 26 (FIG. 1).

In a forward mode of operation, power flows through inverter 44 from DC bus 40 toward AC port 24', and in a reverse mode of operation, power flows through inverter 44 from AC port 24' to DC bus 40. While operating in the forward mode, inverter 44 operates in either an isochronous/master mode or a parallel/slave/droop mode. In the forward, isochronous mode, inverter 44 establishes a voltage amplitude and a phase/frequency for the AC electricity being generated and drives a sync line 48 to which other generation devices may synchronize. In the forward, parallel mode, inverter 44 causes its generated voltage amplitude and phase/frequency for the AC electricity being generated to be synchronized with a signal on sync line 48. Sync line 48 is routed to other power blocks 22 in system 20 through second communication bus 36 (FIG. 1) and possibly through first communication bus 28 (not shown) as well.

Power block 22 may also include an AC generator 50, which couples through a contactor 52 and AC port 24' to AC bus 24 (FIG. 1). Those skilled in the art will appreciate that contactors 46 and 52 may be configured as either mechanical contact devices or as solid state devices. Generator 50 also couples to sync line 48. Generator 50 is desirably, but not necessarily, a fossil-fueled generator which can be remotely operated in either the isochronous or parallel modes.

In one alternate embodiment, generator 50 may be provided by a micro turbine. In another alternate embodiment, generator 50 may couple directly to inverter 44 and be more directly controlled by inverter 44 than depicted in FIG. 2. However, in either embodiment generator 50 eventually couples to AC bus 24. In another alternate embodiment, generator 50 may be omitted altogether in some power blocks 22 but included in other power blocks 22. In these and other embodiments, AC bus 24 may be the public electric power distribution grid. In yet another alternative embodiment, generator 50 may be replaced with the public electric power distribution grid.

A power block controller 54 controls the operation of power block 22. Controller 54 is configured as a computer, having a microprocessor, memory for storing software programming and operational data, timing circuits, I/O devices and ports, and the like (not shown). A power supply 56 functioning as a DC-to-DC converter energizes controller 54 and receives its power from DC bus 40. First and second communication busses 28 and 36 (FIG. 1) couple to I/O ports of controller 54. I/O port control signals from controller 54 communicate with inverter 44, generator 50 and contactors 46 and 52.

Power block 22 is desirably configured so that controller 54 senses substantially the complete instantaneous state of power block 22. As indicated by dotted lines in FIG. 2, controller 54 senses or monitors current flowing at ports where DC sources 38, battery bank 42 and inverter 44 couple to DC bus 40. Likewise, controller 54 senses the voltage of DC bus 40. Collectively and individually, these currents and voltage indicate the state of DC bus 40. Controller 54 also monitors the state of AC bus 24 by monitoring one or more of current, voltage, and power factors at the outputs of inverter 44 and generator 50 and at AC port 24'.

As discussed above in connection with FIG. 1, one of power blocks 22 may be designated as master controller 34. In this embodiment, the same hardware that serves as power block controller 54 also serves as master controller 34. Accordingly, power supply 56 energizes master controller 34 as well as power block controller 54. Separate computer software concurrently performs both master controller and power block controller functions on the same hardware in a manner well understood to those skilled in the art. For the purposes of clarity, master controller 34 will be treated as a different entity from power block controller 54 in the discussion below.

Figure 3:
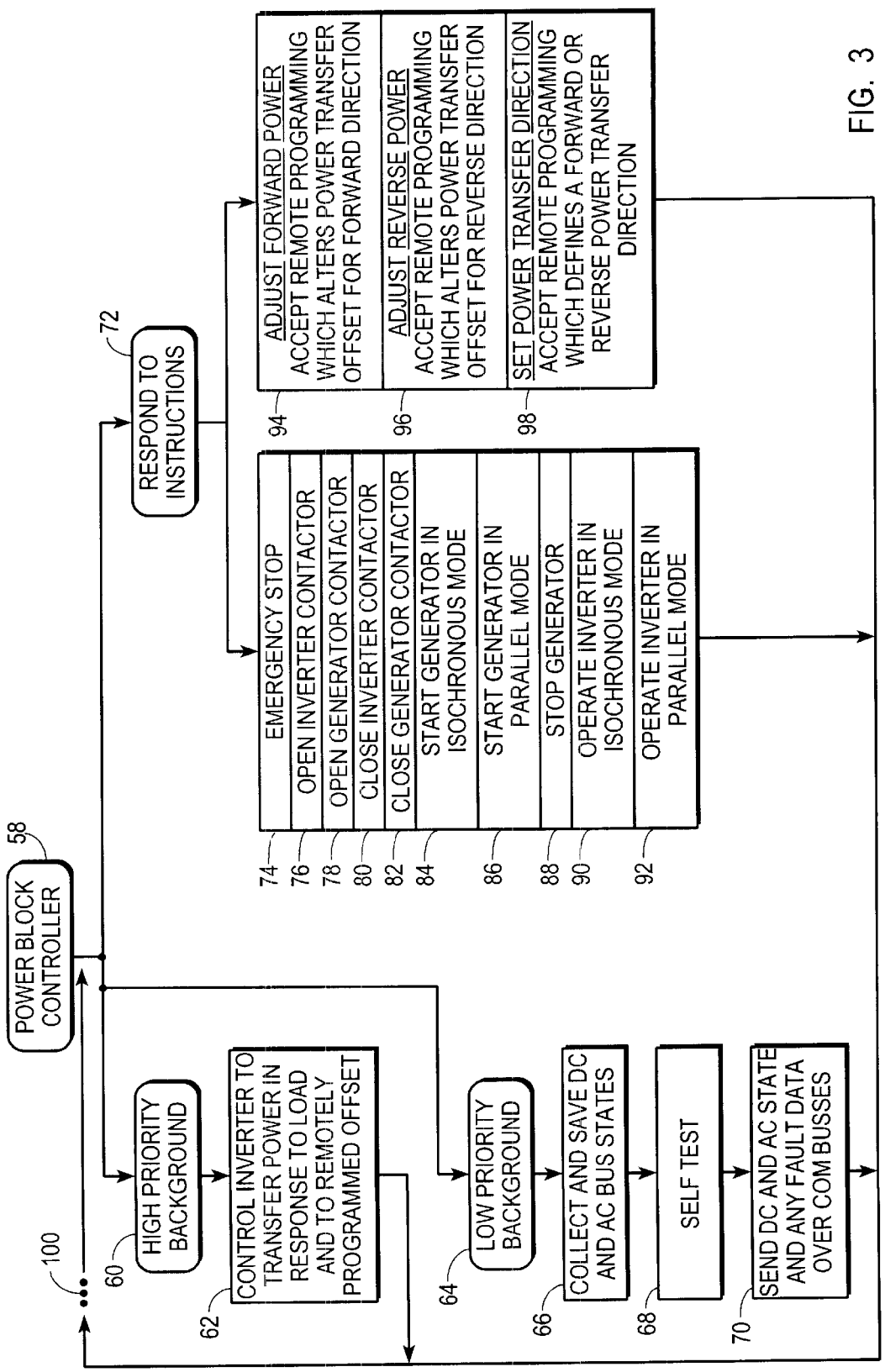
FIG. 3 shows a flow chart of a process performed by the power block of FIG. 2.

FIG. 3 shows a simplified flow chart of a process 58 performed by power block controller 54 (FIG. 2). Process 58 is continuously performed by controller 54 when the power block 22 to which it applies is operational. Process 58 is implemented in a manner known to those skilled in the art through computer software stored in a memory associated with controller 54 and executed by a processor associated with controller 54.

Process 58 includes a high priority background sub-process 60 which controls the instantaneous sinusoidal amplitude and phase/frequency of AC energy being generated in the forward mode. If inverter 44 is operating in the parallel mode, sub-process 60 achieves synchronization with the signal on sync line 48 (FIG. 2), otherwise sub-process 60 causes inverter 44 to generate electricity at a desired standard frequency (e.g., 60 Hz or 50 Hz) and voltage. As indicated at a task 62, sub-process 60 controls inverter 44 (FIG. 2) so that power is transferred in either the forward or reverse direction instantaneously in response to the load. Task 62 also causes power to be transferred in response to a remotely programmed offset which is independent of the instantaneously experienced load. In a preferred embodiment, this offset biases the switch points of switching devices in inverter 44 to deliver slightly more power in the selected direction or slightly less power. Sub-process 60 continuously repeats to operate inverter 44 in real time.

Process 58 includes a low priority background sub-process 64, which is considered low priority only in comparison to sub-process 60. Sub-process 64 performs a task 66 which collects and saves electrical parameters that define the instantaneous states of DC bus 40 and AC port 24'. These parameters may be used by sub-process 60. In addition, sub-process 64 desirably performs a self test task 68. Task 68 monitors data collected from throughout power block 22 in an attempt to determine whether power block 22 is functioning correctly. For example, task 68 may monitor the temperature of generator 50 (FIG. 2), the voltage of DC bus 40 (FIG. 2), and the like to verify operation within acceptable limits.

After tasks 66 and 68, a task 70 sends the current DC and AC bus state parameters recently collected in task 66 and any fault data recently collected during task 68 along with power block identifying data over first and second communication busses 28 and 36, where they are available to master controller 34 (FIG. 1) and external supervisor 30 (FIG. 1). Sub-process 64 continuously repeats so that the state parameters and fault data are supplied in real time. However, in an alternate embodiment, process 58 responds to polled inquiries from either master controller 34 or external supervisor 30 about specific parameters.

Process 58 additionally includes a sub-process 72 which responds to instructions received from communication busses 28 and 36. An emergency stop instruction 74 is performed by causing power block 22 to simultaneously and instantly open contactors 46 and 52 (FIG. 2). An open inverter contactor instruction 76 opens only contactor 46, and an open generator conductor instruction 78 opens only contactor 52. Close inverter contactor and close generator contactor instructions 80 and 82 respectively close contactors 46 and 52. Instructions 84 and 86 place generator 50 in an enabled state by starting generator 50 in isochronous and parallel modes, respectively. A stop generator instruction 88 places generator 50 in a disabled state by stopping generator 50. An operate inverter in isochronous mode instruction 90 may be activated only when generator 50 is disabled, and an instruction 92 operates inverter 44 in the parallel mode.

In addition, an instruction 94 adjusts forward power flow by accepting remote programming which alters the power transfer offset discussed above in connection with task 62 for the forward direction of power flow. Likewise, an instruction 96 adjusts reverse power flow by accepting remote programming which alters the power transfer offset discussed above in connection with task 62 for the reverse direction of power flow. An instruction 98 is performed to explicitly establish the direction of power flow. However, instruction 98 may be omitted when generator 50 directly couples to inverter 44 because the power flow direction is implicitly established through the normal operation of inverter 44. Sub-process 72 continuously repeats so that process 58 remains ready to respond in real time to any upcoming instruction.

As indicated by ellipsis 100 in FIG. 3 and elsewhere in the Figures, this process may include any number of other tasks and processes omitted from the present discussion for clarity.

Figure 4:
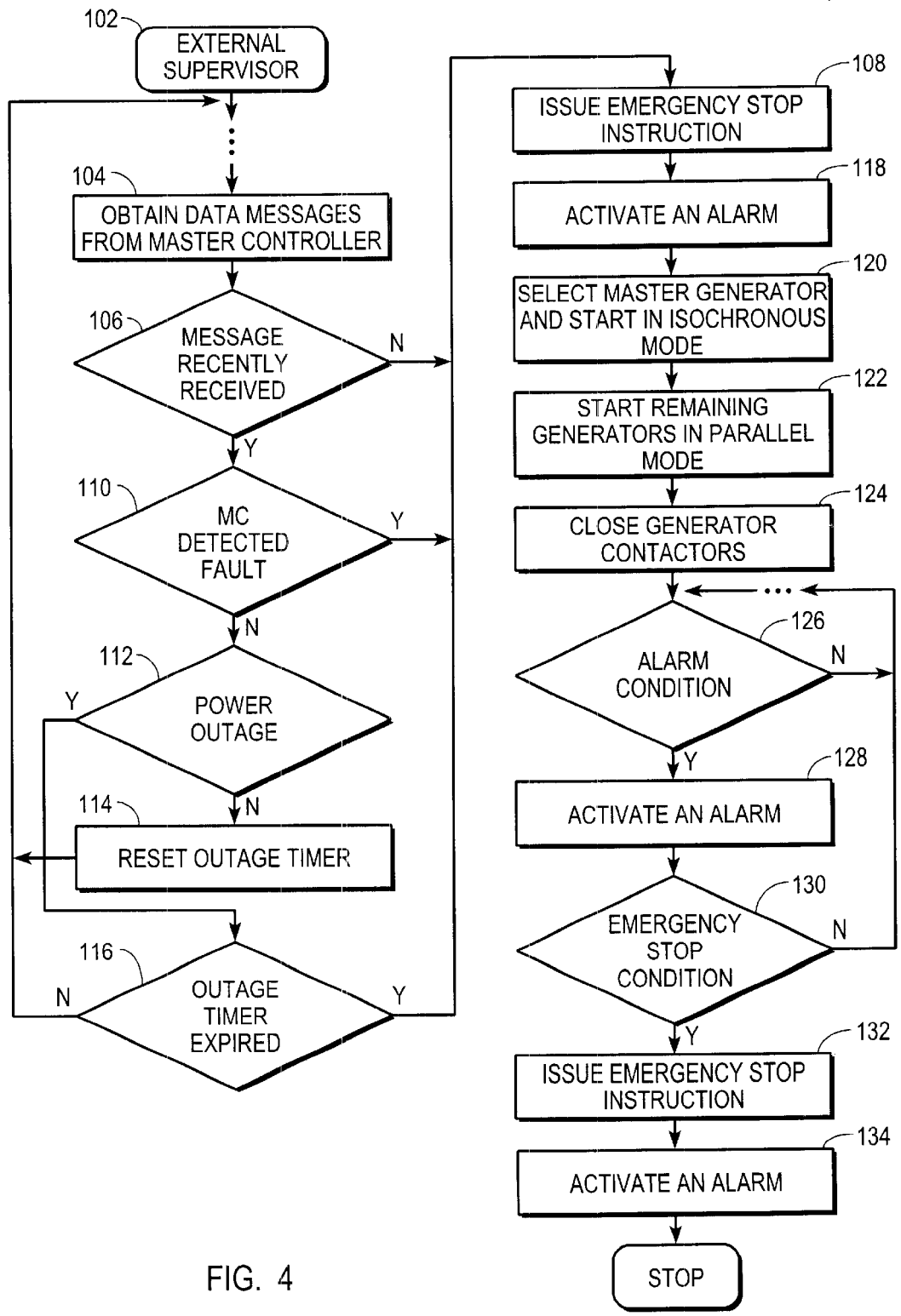
FIG. 4 shows a flow chart of a process performed by an external supervisor portion of the expandable hybrid electric generating system of FIG. 1.

FIG. 4 shows a flow chart of a process 102 performed by external supervisor 30 (FIG. 1). Process 102 is implemented in a manner known to those skilled in the art through computer software stored in a memory associated with external supervisor 30 and executed by a processor associated with external supervisor 30. Generally, external supervisor 30 improves the reliability of system 20 by serving as a backup master controller should master controller 34 be unable to control system 20.

Process 102 includes a task 104 which obtains data messages from master controller 34 (FIGS. 1–2). As discussed in more detail below, master controller 34 regularly sends messages to external supervisor 30. These messages desirably include data which process 102 can use to determine whether a power outage has occurred for system 20. In addition, master controller 34 may conduct selftests and return the results of the self tests to process 102. These and other types of messages, including messages from power blocks 22, can flow to process 102 at task 104.

After task 104, a query task 106 is performed to determine whether any messages have been recently received from master controller 34. The absence of such messages for a predetermined duration indicates a failure in master controller 34, causing program control in process 102 to flow to a task 108, which initiates a routine where external supervisor 30 exerts control over power blocks 22 and system 20. When task 106 determines that messages have been recently received from master controller 34, a query task 110 is performed to determine whether a recently received message indicates that master controller (MC) 34 has self-detected a fault. If a fault message was received from master controller 34, program flow proceeds to task 108.

When task 110 determines that no fault in the operation of master controller 34 has been discovered, a query task 112 is performed to determine whether a power outage has occurred. The determination of task 112 is based upon data received in messages, preferably from master controller 34. Such messages may, for example, convey a summary statistic which describes the cumulative power being delivered by system 20 from instant to instant. When task 112 determines that no power outage has occurred, a task 114 is performed to reset an outage timer, and program flow eventually returns to task 104. As long as no problem with master controller 34 is detected, program control remains in the programming loop of tasks 104, 106, 110, 112 and 114. Task 114 continuously resets the outage timer.

When task 112 determines that a power outage has occurred, a query task 116 then determines whether the outage timer has expired. As long as no problem other than a power outage is detected, program control remains in the programming loop of tasks 104, 106, 110, 112 and 116. The outage timer is not reset in this programming loop. Unless the power outage is corrected within the predetermined duration of the outage timer, the outage timer expires, causing program flow to proceed to task 108. Accordingly, process 102 responds to a power outage that exceeds a predetermined duration by thereafter taking control of power blocks 22. However, a momentary power outage does not cause control to be taken from master controller 34.

Task 108 is performed when a fault in master controller 34 occurs or is assumed to have occurred. Task 108 issues an emergency stop instruction 74 (FIG. 3) which is communicated to all power blocks 22 and to master controller 34. Power blocks 22 are instantly disabled from supplying power to AC bus 24 when a fault in master controller 34 occurs so that system 20 is brought to a known, safe state.

Following task 108, a task 118 activates an alarm. In task 118 and other tasks discussed below where alarms are activated, any suitable annunciation of the alarm condition occurs. Preferably, the annunciation of the alarm condition describes the situation which lead to the alarm. In a preferred embodiment, alarms are annunciated via a radio communication link (e.g., cellular facsimile) to a remote monitoring site where a human operator can quickly investigate.

Next, a task 120 selects a "master" generator 50 from power blocks 22 and issues instruction 84 (FIG. 3) to start the generator 50 in its isochronous mode. A wide variety of techniques may be used to select the generator 50 which will serve as the master. For example, a priori programming may simply dictate which generator 50 to use as the master. Alternatively, a wide variety of algorithms may be performed to make a suitable selection.

After task 120, a task 122 starts the remaining generators 50 of power blocks 22 in their parallel modes by issuing instructions 86 (FIG. 3) to the remaining power blocks 22. Tasks 120 and 122 may implicitly verify that the generators 50 have indeed started by verifying the receipt of start acknowledgement messages. If selected generators 50 fail to start, then an appropriate alarm may be activated. In an alternate embodiment, process 102 may include intelligence to evaluate the power being generated by system 20 immediately prior to accepting control of power blocks 22 and the duration which has transpired since the moment for which power data were obtained. Based upon this evaluation, task 122 can then start only the number of generators 50, perhaps even none of generators 50, which are needed to generate that amount of power, with a suitable margin to cover starting currents and an additional load. In one embodiment, process 102 may simply attempt to start system 20 using only inverters 44 from power blocks 22 and then perform tasks 120 and 122 only if such an attempt is unsuccessful.

After task 122, a task 124 closes generator contactors by issuing instruction 82 (FIG. 3) to all power blocks 22 for which generators 50 have been started. Desirably, all generator contactors close substantially simultaneously. Accordingly, task 124 enables generators 50 to provide power to AC bus 24 after task 108 disabled power blocks 22 from supplying power to AC bus 24.

Following task 124, a query task 126 monitors data obtained from power blocks 22 to detect an alarm condition. An alarm condition is a worrisome, but not necessarily critical, operational condition. For example, alarm conditions may be declared if a generator 50 runs low on fuel, if a generator 50 is running unusually hot, and the like. So long as no alarm condition is detected, program control continues to loop through task 126.

When task 126 detects an alarm condition, a task 128 activates an alarm and a query task 130 determines whether the alarm condition also represents an emergency stop condition. An emergency stop condition is a critical condition, such as unacceptably low voltage on AC bus 24. So long as no emergency stop condition occurs, program control loops back to task 126. If an emergency stop condition occurs, a task 132 issues emergency stop instruction 74 (FIG. 3) to disable all power blocks 22 from supplying power to AC bus 24, and a task 134 activates an alarm. At this point, multiple faults have occurred and continued operation may pose a risk to property and/or life. Accordingly, process 102 stops.

While process 102 depicts a relatively simple process for controlling power blocks 22 when a fault occurs in master controller 34, alternate embodiments may make process 102 more sophisticated. For example, process 102 may be expanded to encompass many, if not all, of the functions provided in master controller 34, as discussed below.

FIG. 5 shows a flow chart of a first background process 136 performed by master controller 34. Process 136 and other master controller processes discussed below are implemented in a manner known to those skilled in the art through computer software stored in a memory associated with master controller 34 and executed by a processor associated with master controller 34. Generally, master controller 34 controls the enablement and disablement of generators 50 to support the electrical load 26 (FIG. 1) and maintain battery banks 42 (FIG. 2) and other DC energy sources 38 (FIG. 2). In addition, master controller 34 maintains balance between DC busses 40 (FIG. 2) of power blocks 22 so that battery banks 42 experience similar charge/discharge cycles to maximize their useful lives and so that inverters 44 need not experience an unequal share of load. Background process 136 is continuously performed by master controller 34 and performed concurrently with other processes discussed below.

Process 136 performs a task 138 to collect and save data messages from power blocks 22. As discussed above in connection with process 64 (FIG. 3), such messages convey parameters describing the relatively instantaneous states of DC buses 40 and AC ports 24'. In addition, such messages may indicate a fault at a particular power block 22.

After task 138, a task 140 individually filters the DC state parameters and a task 142 individually filters the AC state parameters so that the filtered state parameters are substantially non-responsive to instantaneous changes. For example, messages from power blocks 22 indicate relatively instantaneous voltages of DC busses 40, along with instantaneous currents at various ports to DC busses 40. These relatively instantaneous voltages and at least some of the currents are responsive to instantaneous changes in electrical load 26. The decisions and control functions implemented by master controller 34 desirably do not interfere with the normal operation of inverters 44 in responding to such instantaneous load changes. Accordingly, task 140 filters the state parameters, such as DC bus voltage, so that a feedback control loop implemented through master controller 34 operates significantly more slowly than feedback control loops implemented within inverters 44. Consequently, both types of feedback control loops remain stable.

After tasks 140 and 142, a task 144 calculates a power outage statistic and sends a suitable message conveying this statistic to external supervisor 30, as discussed above in connection with tasks 104 and 112 (FIG. 4). One suitable statistic may be the total power being delivered by system 20. After task 144, a query task 146 determines whether an emergency stop instruction has been received, perhaps from external supervisor 30 as discussed above in connection with tasks 108 and 132 (FIG. 4). So long as no emergency stop instruction is received, program flow loops back to task 138 so that process 136 remains continuously operational. However, if an emergency stop instruction is detected, process 136 stops further operation of master controller 34.

Figure 6:
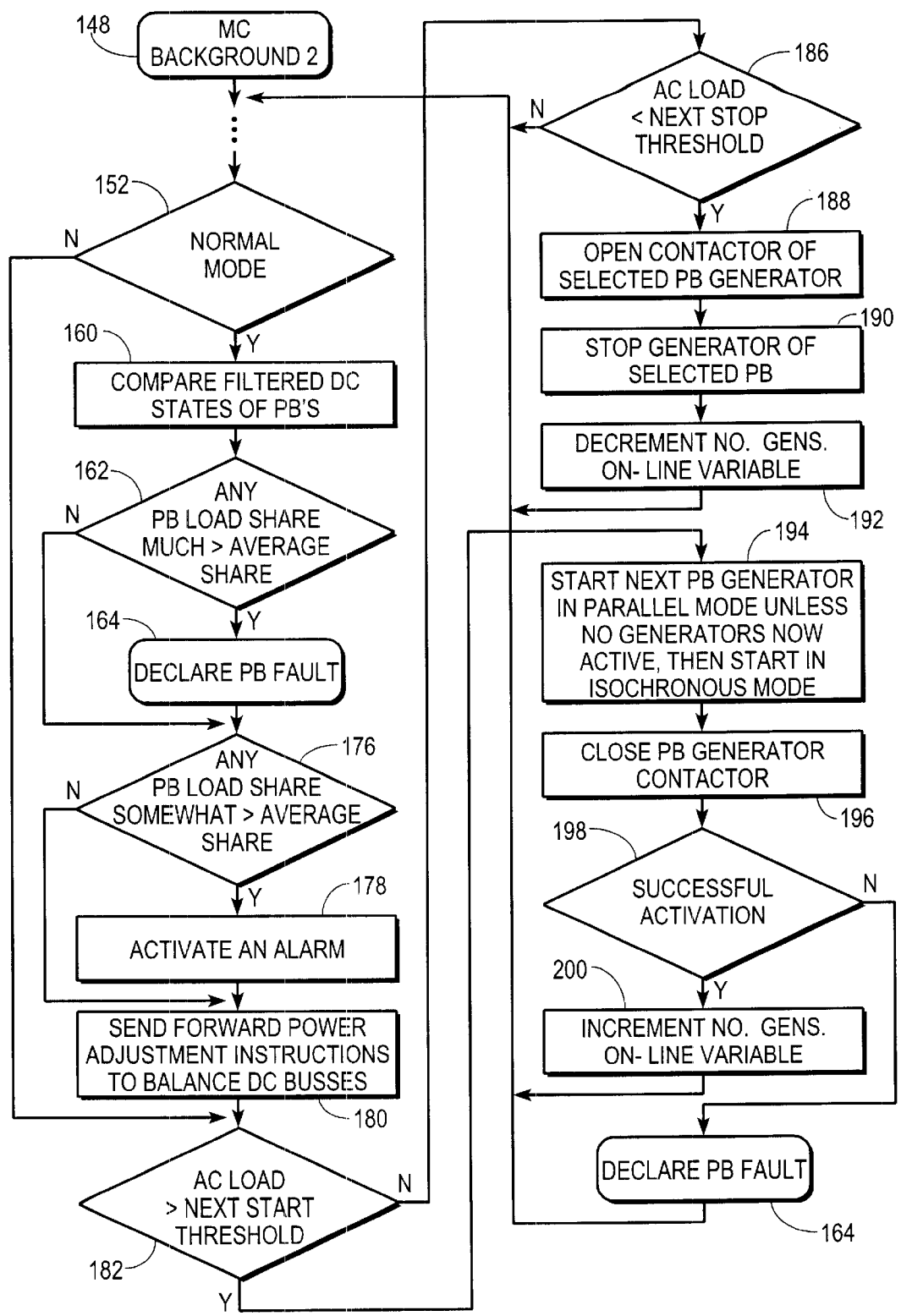
FIG. 6 shows a flow chart of a second background process performed by the master controller.
Figure 7:
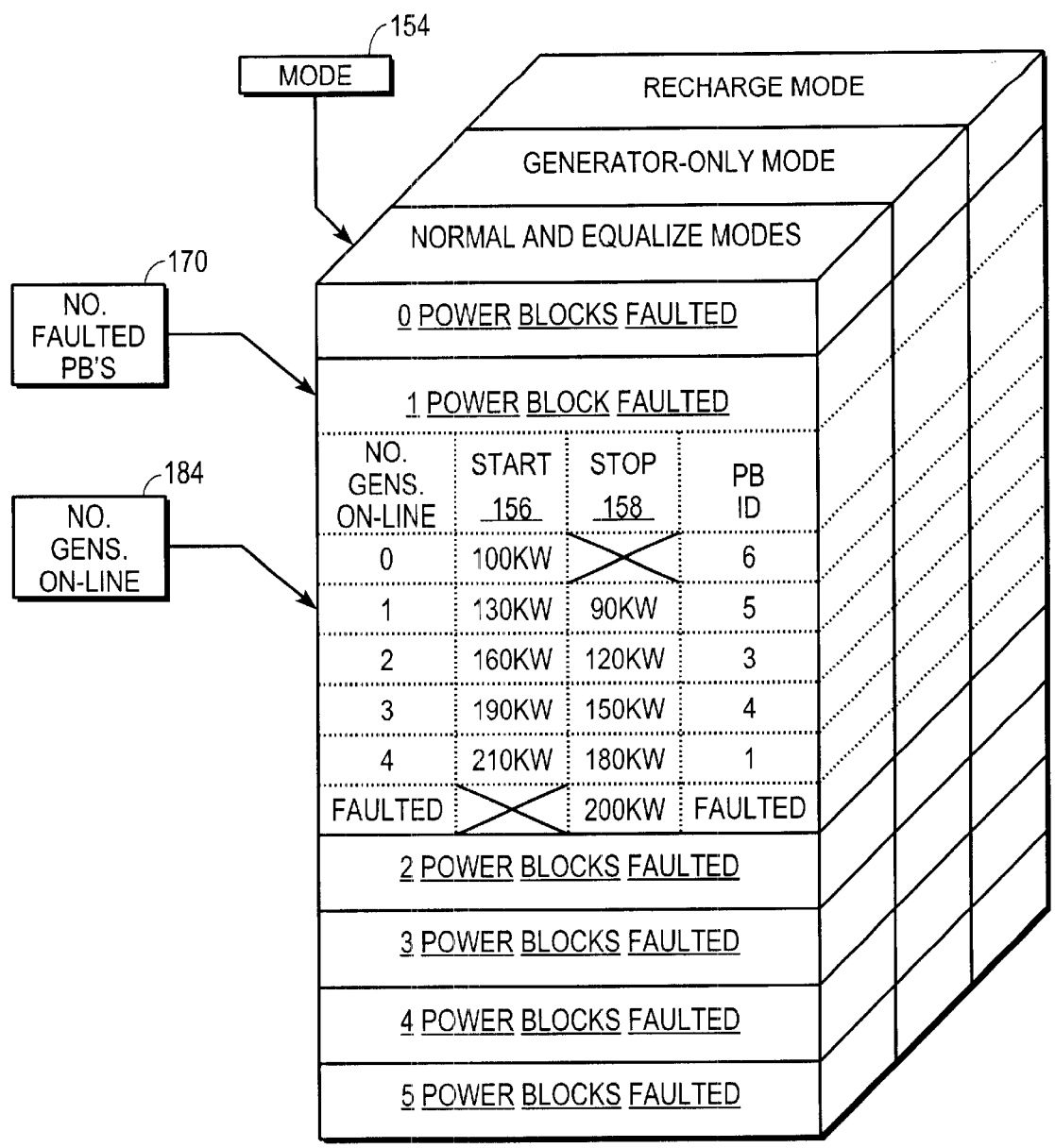
FIG. 7 shows a block diagram of an exemplary memory structure used in connection with the second background process of FIG. 6 and other processes.

FIG. 6 shows a flow chart of a second background process 148 performed by master controller 34, and FIG. 7 shows a block diagram of an exemplary memory structure, referred to below as set-point table 150, used in connection with process 148. Process 148 also operates continuously in the background while other processes are performed. Generally, process 148 controls the activation and deactivation of generators 50 to match the changing load and maintains balance between DC busses 40 of power blocks 22 to minimize battery charge cycling and to equalize inverter loading.

Referring to FIGS. 6 and 7, process 148 includes a query task 152. Task 152 determines whether a present mode of operating master controller 34 is a normal mode. Task 152 may make its determination by evaluating a mode variable 154 in set-point table 150. Set-point table 150 is configured to provide start and stop threshold values 156 and 158 for any number of diverse modes of operation. FIG. 7 illustrates the four modes of: normal, equalize, generator-only, and recharge. The normal and equalize modes are listed together in a common section of set-point table 150 because the same start and stop thresholds 156 and 158 may, but need not, be used for both modes. However, master controller 34 is generally programmed so that different modes of operation may use different start and stop thresholds 156 and 158. The normal mode of operation occurs when at least some of the power being generated by system 20 is coming from DC busses 40 and no inverters 44 operate in their reverse modes. The generator-only mode occurs when all power being generated from system 20 is coming from generators 50 and inverters 44 have been taken off-line. The recharge mode occurs when battery banks 42 or other DC energy sources 38 are being recharged and inverters 44 operate in the reverse mode, and the equalize mode occurs when a battery bank 42 in at least one of power blocks 22 is being equalized. Equalization represents the battery maintenance procedure wherein a very high voltage is presented for a limited duration to a battery having nearly a full charge to knock off corrosion on battery plates.

When task 152 determines that master controller 34 is operating in its normal mode, a task 160 is performed to compare the filtered states, as generated through tasks 142 and 144 (FIG. 5), of DC busses 40 and AC ports 24' in power blocks 22. In response to task 160, a query task 162 determines whether any power block 22 has a share of electrical load 26 which is much different (e.g., 30%) than the average load share. In other words, task 162 determines a difference between the average load share taken over all power blocks supplying power to AC bus 24 and the actual load borne by each power block 22. If this difference is greater than a relatively high predetermined amount, due to supplying either too much or too little power, then a process 164 is performed to declare that power block 22 as having faulted.

FIG. 8 shows a flow chart of process 164. In general, process 164 disables an identified power block 22 from supplying electrical power to AC bus 24. Referring to FIGS. 7 and 8, process 164 includes a task 166 which instructs the faulted power block 22 to open its inverter and generator contactors, thereby taking that power block 22 off-line. Next, a task 168 updates a variable 170 (FIG. 7) which indicates the number of faulted power blocks 22 currently present in system 20. Set-point table 150 is configured so that different start and stop thresholds 156 and 158 are available when different numbers of power blocks 22 have faulted. FIG. 7 illustrates details for an exemplary situation where master controller 34 is operating in the normal or equalize mode and one power block 22 has faulted. Start and stop thresholds 156 and 158 are provided for different numbers of generators 50 which may be on-line in this situation.

After task 168, a task 172 organizes set-point table 150 so that the just-faulted power block 22 is unavailable for future assignments. In the exemplary embodiment of set-point table 150 illustrated in FIG. 7, each page of table 150 includes a list ranked by power block 22, with higher priority power blocks 22 placed at the top of the ranking and lower priority power blocks 22 placed at the bottom. This exemplary priority ranking lists power blocks 22 in a prioritized order by power block identity (PB ID) of: 6, 5, 3, 4 and 1. Thus, the first generator 50 to be brought on-line to handle an increased load will be the generator 50 in power block 6, the next in power block 5, and so on. The criteria used for ranking power blocks 22 is not an important feature of the present invention, but in general more efficient or newer power blocks may desirably be ranked higher because they will tend to be used more often. Power block 2 is the faulted power block in this example. Task 172 has organized this page of set-point table 150 so that the non-faulting power blocks 22 have a higher priority and so that the faulting power block 22 is indicated as having faulted and is therefore unavailable.

After task 172, a task 174 activates a suitable alarm and program flow returns to the point from which process 164 was called.

Referring back to FIG. 6, after declaring a power block fault or when task 162 determines that no power block 22 share of the load is much greater than the average share, a query task 176 is performed in response to task 160 to determine whether any power block 22 has a share of electrical load 26 which is only somewhat different (e.g., 15%) than the average load share. In other words, task 176 determines a difference between the average load share taken over all power blocks supplying power to AC bus 24 and the actual load borne by each power block 22. If this difference is greater than a relatively low predetermined amount, due to supplying either too much or too little power, then a task 178 is performed to activate a suitable alarm. Of course, if the load share is much different than average, as determined by task 162, it will also be somewhat different than the average and an alarm will also be activated.

After task 178 or when task 176 determines that no power block load share is somewhat different than the average, a task 180 is performed. Task 180 is also performed in response to the comparisons of task 160. In particular, task 180 maintains approximately equal states at DC busses 40 of power blocks 22 by sending forward power adjustment instructions 94 (FIG. 3) to all on-line power blocks 22 to balance the DC states. Thus, if DC bus 40 on one power block 22 is at a slightly lower voltage than the average DC bus voltage a forward power adjustment instruction 94 may be issued to decrease the power flow from that DC bus 40 to AC bus 24. Conversely, if DC bus 40 on one power block 22 is at a slightly higher voltage than the average DC bus voltage a forward power adjustment instruction 94 may be issued to increase the power flow from that DC bus 40 to AC bus 24. By maintaining approximately equal states at DC busses 40 of power blocks 22, battery charge cycles are minimized for all power blocks and battery life extended, and the loading on inverters 44 is equalized across all inverters 44 to increase inverter reliability.

After task 180 and when task 152 determines that the current operational mode for master controller 34 is not the normal mode, a query task 182 is performed. Task 182 evaluates set-point table 150 (FIG. 7) and load parameters, such as current and voltage parameters at each AC port 24' to determine whether the current electrical load 26 is greater than the next start threshold 156. As discussed above, the current page of table 150 is determined in response to the then-current mode and the number of power blocks that have faulted. The specific next start threshold 156 evaluated in task 182 is also a function of the number of generators (GENS.) currently on-line, as set forth in a variable 184. For the exemplary situation depicted in FIG. 7, when no generators 50 are currently on-line, the generator 50 in power block 6 will be brought on-line when the electrical load rises above 100 kW. When one generator 50 is currently on-line, the generator 50 in power block 5 will be brought on-line when the electrical load rises above 130 kW, and so on.

When task 182 determines that the then-current AC load is not greater than the next start threshold 156, a query task 186 is performed to determine whether the current AC load is less than the next stop threshold 158. As above, the next stop threshold 158 evaluated in task 186 is also a function of the number of generators currently on-line, as set forth in a variable 184. For the exemplary situation depicted in FIG. 7, when two generators 50 are currently on-line, the generator 50 in power block 5 will be taken off-line when the electrical load sinks below 120 kW. When one generator 50 is currently on-line, the generator 50 in power block 6 will be taken off-line when the electrical load sinks below 90 kW, and so on. If task 186 determines that the current AC load is not less than the next stop threshold 158, then program control loops back to task 152.

When task 186 determines that the current AC load is less than the next stop threshold 158, a task 188 sends an instruction 78 (FIG. 3) to open the generator contactor of the selected power block 22. This power block 22 is selected by reference to the power block identification column of the currently active page of set-point table 150. Next, a task 190 issues an instruction 88 (FIG. 3) to stop the selected generator, and a task 192 decrements variable 184, which tracks the number of generators currently on-line. Following task 192, program control loops back to task 152.

When task 182 detects that the current AC load is greater than the next start threshold 156, a task 194 starts the next power block 22 generator 50. The next generator 50 is identified by reference to the power block identification column of the currently active page of set-point table 150. If no generators 50 are currently active, the generator 50 is started in the isochronous mode by using instruction 84 (FIG. 3). Otherwise, the generator 50 is started in the parallel mode using instruction 86 (FIG. 3).

After task 194 and when process 148 verifies that the selected generator started successfully, a task 196 is performed to close the subject generator contactor using an instruction 82 (FIG. 3). Following task 196, a query task 198 determines whether a generator 50 has been successfully activated. If so, a task 200 increments variable 184, which tracks the number of generators 50 currently on-line. Following task 200, program control loops back to task 152. If the selected generator 50 fails to start or otherwise be brought on-line, that power block 22 may be declared as having faulted through process 164, and another generator 50 may be brought on-line through the execution of a subsequent iteration of process 148.

FIG. 9 shows a flow chart of a foreground process 202 performed by master controller 34. Foreground process 202 includes a task 204 that performs various types of initialization. During task 204, process 202 initializes variables, tables, and the like used by master controller 34 and may perform self-tests. If any faults are discovered, appropriate data messages may be sent to external supervisor 30 and an appropriate alarm activated. Upon initialization, background processes 136 (FIG. 5) and 148 (FIG. 6) may commence.

Also after initialization, a query task 206 determines whether system 20 is currently on-line. In other words, task 206 determines whether power blocks 22 are supplying power to AC bus 24. If system 20 is discovered to be off-line, a process 208 is performed to place master controller 34 in a restart mode and to restart system 20. Generally, in the restart mode, master controller 34 may predict the current value of electrical load 26 by evaluating the last known electrical load value and the time that has elapsed since that value was determined. If the time has been brief, process 208 determines whether system 20 has sufficient capacity to perform a start using only inverters 44 in the power blocks 22 that are available for service. In this case, the inverter 44 in the highest priority power block 22 is operated in the isochronous mode using instruction 90 (FIG. 3) and the inverters 44 in the remaining available power blocks 22 operated in the parallel mode using instructions 92 (FIG. 3). When all power blocks 22 are synchronized, the inverter contactors are closed using instruction 80 (FIG. 3).

When master controller 34 cannot predict the expected value of load 26, process 208 assumes that all available capacity is necessary to perform a start. In this case, the generator 50 in the highest priority power block 22 is operated in the isochronous mode using instruction 84 (FIG. 3) and all remaining available inverters 44 and generators 50 operated and started in the parallel mode using instructions 92 and 86 (FIG. 3). When all power blocks 22 are synchronized, the inverter and generator contactors are closed using instructions 80 and 82 (FIG. 3).

Of course, if master controller 34 can predict that starting an expected load 26 requires inverter capacity plus fewer than all generators 50, then only the generators 50 needed may be started. In starting system 20, soft start capabilities, wherein voltage and frequency are permitted to momentarily sag upon impact of starting then ramp up, for generators 50 and inverters 44 are desirable, but not required. In addition, testing for faults in starting and operating generators 50 and operating inverters 44 is performed. If faults are discovered, then the faulting power blocks 22 are declared as having faulted and appropriate alarms are activated.

Upon the completion of process 208 or when task 206 discovers system 20 to be on-line, program flow proceeds to a query task 210. Task 210 determines whether master controller 34 is being requested to operate in its generator-only mode. The generator-only mode may be specified by a user in order to perform certain maintenance functions. When the generator-only mode is requested, a task 212 is performed to set mode variable 154 (FIG. 7) to indicate operation in the generator-only mode, and a task 214 issues instruction 76 (FIG. 3) to all active power blocks 22 to open inverter contactors.

Preferably, task 214 does not simply open all inverter contactors immediately after the performance of task 212. When mode variable 154 (FIG. 7) changes to the generator-only mode as a result of task 212, background process 148 (FIG. 6) then uses different set-point start thresholds 156 (FIG. 7), which are generally lower than those specified for the normal mode of operation. Consequently, background process 148 will begin to bring generators 50 on-line in response to operation under the new start set-point thresholds. Thus, as generators 50 come on-line task 214 may slowly and sequentially open inverter contactors until all inverter contactors have been opened.

Upon completion of task 214 or when task 210 fails to discover a request for the generator-only mode, program flow proceeds to a query task 216. Task 216 determines whether battery banks 42 (FIG. 2) require recharging. Task 216 may make its determination by evaluating the then-current state of DC busses 40, which have been kept approximately equal due to the operation of background process 148 (FIG. 6). Task 216 may determine that recharging is needed when, for example, the voltage of DC busses 40 drops to a predetermined threshold. In addition, task 216 may evaluate other considerations, such as the duration since the previous recharge cycle, in determining whether recharging is needed now. In one embodiment, battery banks 42 may be omitted, but recharging may be applied to DC energy sources 38 in the form of fuel cells.

When no recharging is needed, program flow eventually returns to task 206 to repeat the substance of foreground process 202 in a continuous loop. However, as with other flow charts presented in the figures, ellipses 218 are depicted in this program flow path to indicate that other processes and tasks may be performed. Such other tasks and processes may include on-going self tests, the results of which are sent to external supervisor 30, a user I/O interface, and other routines conventionally used with computer-controlled equipment.

Figure 10:
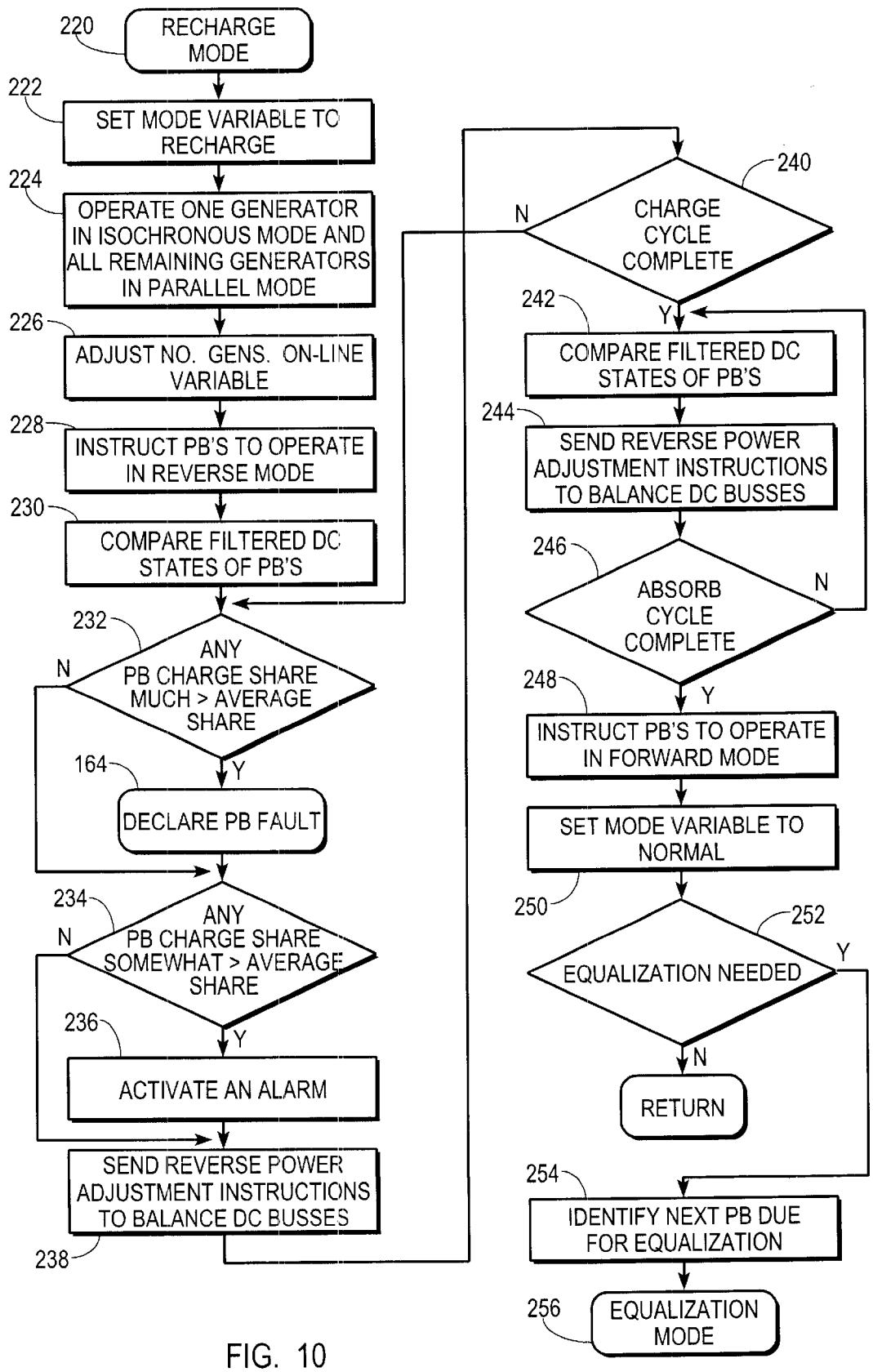
FIG. 10 shows a flow chart of a process performed by the master controller when the master controller is in a recharge mode of operation.

When task 216 determines that recharging is needed, a process 220 is performed by master controller 34. FIG. 10 shows a flow chart of a process 220. Process 220 includes a task 222 which sets mode variable 154 (FIG. 7) to the recharge mode. As a result, background process 148 (FIG. 6) will bypass its tasks 160, 162, 176, 178 and 180, which would otherwise monitor DC busses 40 with inverters 44 operating in their forward directions. However, process 148 will continue to perform tasks that bring generators 50 on-line when needed and take generators 50 off-line when no longer needed. That need will be determined in accordance with start and stop thresholds 156 and 158 that differ from those used in the normal mode of operation through the use of a different section of set-point table 150.

After task 222, a task 224 specifically starts the highest priority generator 50 in the isochronous mode and all remaining available generators 50 in their parallel modes. In addition, task 224 closes respective generator contactors when synchronization has been achieved to bring all available generators 50 on-line. Next, a task 226 adjusts the number of generators on-line variable 184 (FIG. 7) to indicate the correct number of on-line generators 50.

Following task 226, a task 228 issues instructions 98 (FIG. 3) to all active power blocks 22 to cause their inverters 44 to operate in their reverse directions. However, as discussed above, in the alternate embodiment where generators 50 couple directly to inverters 44 and are controlled directly thereby, such instructions and task 228 are not necessary. As a result of tasks 222, 224, 226, and 228, battery banks 42 will begin charging, and background process 148 (FIG. 6) will take generators 50 off-line as the charge going into battery banks 42 tapers off and some of generators 50 are no longer needed.

After task 228, a task 230 compares the filtered states of DC busses 40 in the now-charging power blocks 22. In particular, task 230 monitors the voltage of DC busses 40 and the currents at the ports where battery banks 42 and inverters 44 couple to the DC busses 40. The filtered state parameters are available as a result of task 140 in background process 136 (FIG. 5). Subsequent tasks are based upon these comparisons.

After task 230, a query task 232 determines whether any power block 22 is experiencing a charge share that is much different (e.g., 30%) than the average charge share. In other words, task 232 determines a difference between the average charge share taken over all power blocks being charged and the actual charge experienced by each power block 22. If this difference is greater than a relatively high predetermined amount, due to either too large or too small of a charge, then process 164 (FIG. 8) is performed to declare power block 22 as having faulted.

After declaring a power block fault or when task 232 determines that no power block 22 share of the charge is much different than the average share, a query task 234 is performed in response to task 230 to determine whether any power block 22 has a charge share which is only somewhat different (e.g., 15%) than the average charge share. In other words, task 234 determines a difference between the average charge share taken over all power blocks and the actual charge being experienced by each power block 22. If this difference is greater than a relatively low predetermined amount, due to supplying either too great or too small of a charge, then a task 236 is performed to activate a suitable alarm. Of course, if the charge share is much different from the average, as determined by task 232, it will also be somewhat different than the average and an alarm will also be activated.

After task 236 or when task 234 determines that no power block charge share is somewhat different than the average, a task 238 is performed. Task 238 is also performed in response to the comparisons of task 230. In particular, task 238 maintains approximately equal states at DC busses 40 of power blocks 22 by sending reverse power adjustment instructions 96 (FIG. 3) to all charging power blocks 22 to balance the DC states. Thus, if DC bus 40 on one power block 22 is at a slightly lower voltage than the average DC bus voltage, a reverse power adjustment instruction 96 may be issued to increase the power flow to that DC bus 40 from AC bus 24. Conversely, if DC bus 40 on one power block 22 is at a slightly higher voltage than the average DC bus voltage, a reverse power adjustment instruction 96 may be issued to decrease the power flow to that DC bus 40 from AC bus 24. By maintaining approximately equal states at DC busses 40 of power blocks 22, battery charge cycles are minimized for all power blocks and battery life extended.

Following task 238, a query task 240 determines whether the charge cycle portion of the overall recharge cycle is complete. Those skilled in the art will appreciate that the charge cycle refers to that portion of the overall recharge cycle where battery voltage and current are increasing. Preferably, task 240 monitors voltage and current taper to determine the completion of the charge cycle. If the charge cycle is not complete, program flow loops back to task 232 to continue the charge cycle.

When the charge cycle is complete, battery banks 42 enter the absorb cycle portion of the overall recharge cycle. The absorb cycle occurs when the voltage remains substantially constant and the current drops. During the absorb cycle, process 220 performs tasks 242, 244 and 246. Task 242 compares the filtered DC bus state parameters in a manner similar to that described for task 230, and task 244 sends reverse power adjustment instructions to maintain balance at DC busses 40 in a manner similar to that described for task 238. Unlike the charge cycle, during the absorb cycle process 220 refrains from disabling power blocks 22 due to any unequal charging share because unequal charging shares at this point in the overall recharge cycle do not indicate a problem.

Query task 246 follows tasks 242 and 244. Task 246 tests for the end of the absorb cycle. Desirably, task 246 evaluates charge taper and/or elapsed time to determine whether the absorb cycle is complete. So long as the absorb cycle is not yet complete, program control loops back to task 242 to continue monitoring the DC bus states to maintain approximately equal states at DC busses 40.Following task 246, a task 248 instructs inverters 44 to operate in their forward directions by issuing instructions 98 where needed. Next, a task 250 sets mode variable 154 (FIG. 7) to indicate the normal mode. At this point, the battery banks 42 have been recharged.

After task 250, a query task 252 determines whether equalization is needed. If no equalization is scheduled, program flow exits process 220 and returns to process 202 (FIG. 9) with master controller 34 operating in its normal mode.

Equalization is performed only occasionally. It requires the presentation of a high voltage at a battery bank 42, but little current is needed. In the preferred embodiment, equalization is performed on only one power block 22 at a time. Thus, the power required for equalization is most likely to be taken from other power blocks 22 without the activation of a generator 50 just for equalization. The performance of equalization without the activation of generators 50 for only that purpose is desirable because it prevents a particularly inefficient use of generators 50 to supply only the small amount of power used in equalization.

If task 252 determines that an equalization is needed, a task 254 identifies the next power block 22 that is due for equalization, and program flow passes to equalization mode process 256.

Figure 11:
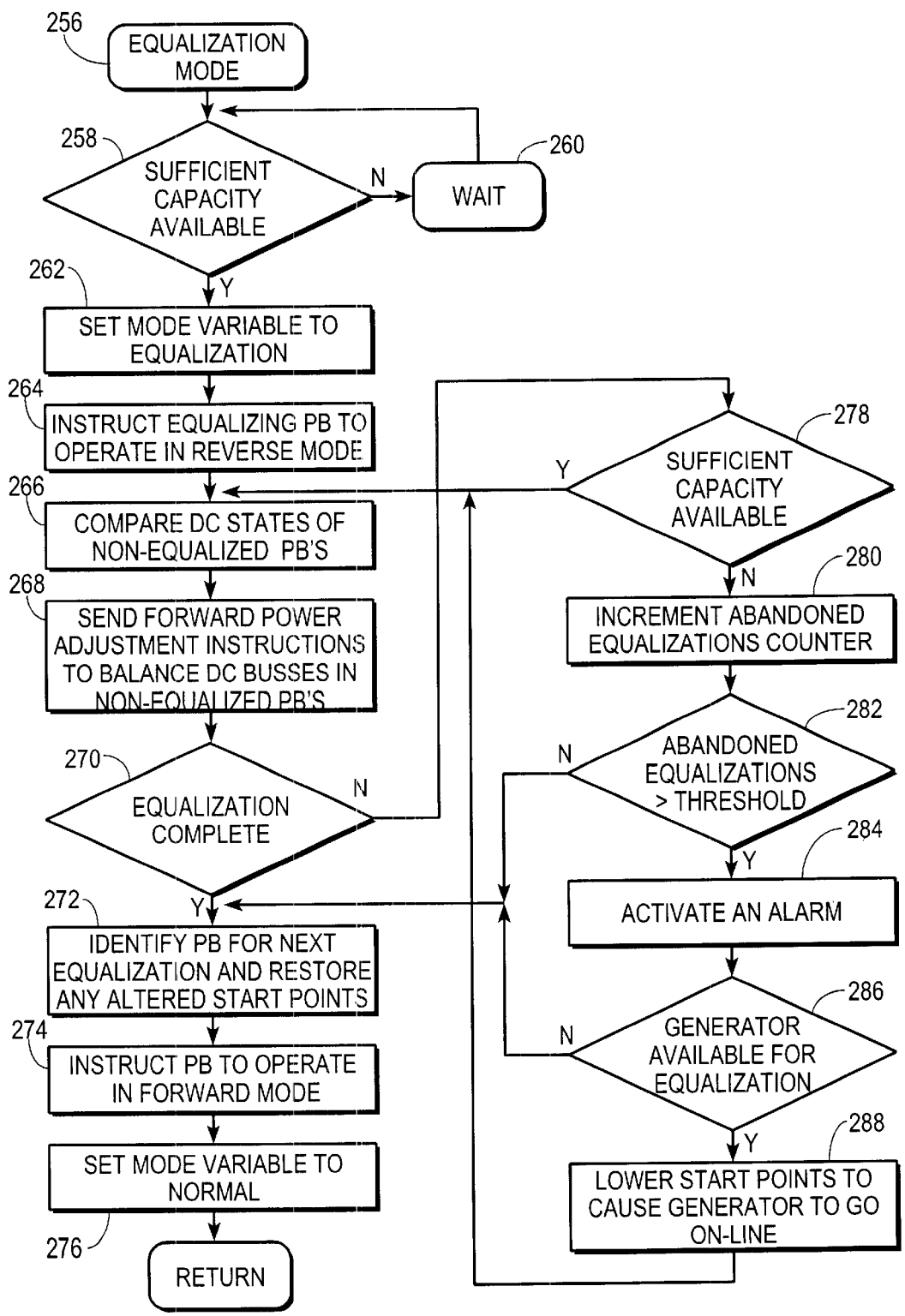
FIG. 11 shows a flow chart of a process performed by the master controller when the master controller is in an equalization mode of operation.

FIG. 11 shows a flow chart of equalization mode process 256. Master controller 34 enters process 256 operating in the normal mode. Then, a query task 258 determines whether the current power generating capacity of system 20, without activating additional generators 50, is sufficient to handle equalization. During task 258, the current electrical load may be compared with the next start threshold 156 in set-point table 150 (FIG. 7). A sufficient power difference should be found to handle equalization plus a margin of safety. If task 258 fails to find sufficient capacity, then a wait process 260 is performed. Wait process 260 operates in conjunction with task 258 to prevent program control from proceeding until sufficient capacity becomes available. Of course, various error handling routines may be included to prevent program control from remaining at tasks 258 and 260 indefinitely.

When task 258 discovers sufficient capacity to begin equalization on the identified power block 22, a task 262 sets mode variable 154 (FIG. 7) to indicate the equalization mode and performs other initialization activities.

Next, if necessary a task 264 instructs the equalizing power block 22 to operate its inverter 44 in the reverse mode by issuing instruction 98. After task 264, process 256 performs tasks 266 and 268. Task 266 compares the filtered DC bus state parameters for the non-equalizing power blocks 22 in a manner similar to that described for task 160 in background process 148 (FIG. 6), and task 268 sends forward power adjustment instructions to maintain balance at the non-equalizing DC busses 40 in a manner similar to that described for task 180 in background process 148. Although not illustrated in FIG. 11, activities may be included with tasks 266 and 268 to test for imbalanced load share, as discussed above in connection with background process 148.

Query task 270 follows tasks 266 and 268. Task 270 tests whether equalization is complete. Desirably, task 270 evaluates a number of considerations. For example, task 270 may declare equalization to be complete when equalization has continued for a maximum duration. In addition, task 270 may declare equalization to be complete when equalization has continued for a minimum duration but the currently available capacity has dropped to a point where a generator 50 needs to be brought on-line to handle the load.

When equalization is complete, a task 272 identifies the next power block 22 to receive equalization and restores any start thresholds 156 (FIG. 7) altered by process 256. The altering of thresholds is discussed below in connection with task 288, but no thresholds are altered in the normal course of events. After task 272, if necessary a task 274 instructs the equalizing power block 22 to operate its inverter 44 in its forward mode by issuing instruction 98 (FIG. 3). Then, a task 276 sets mode variable 154 (FIG. 7) to the normal mode and program control returns to process 202 (FIG. 9) with master controller 34 operating in the normal mode.

When task 270 determines that equalization is not yet complete, a query task 278 is performed to test for continued sufficient capacity to continue equalization without starting additional generators 50. If capacity continues to be sufficient, then program flow loops back to task 266 to continue equalization.

When task 278 fails to find sufficient capacity, a task 280 increments an abandoned equalizations counter, and a query task 282 is performed. Task 282 evaluates the abandoned equalizations counter to determine whether equalization for the currently equalizing power block 22 has been abandoned more than a predetermined number of times. So long as equalization has not been abandoned too many times, program control passes to task 272, discussed above. Task 272 will identify the current equalizing power block 22 as the next equalizing power block, and program control will eventually return to process 202 (FIG. 2) with master controller 34 operating in the normal mode. Equalization for this power block 22 will be attempted again at the completion of the next recharge cycle.

When task 282 discovers that equalization has been abandoned more than the predetermined number of times, a task 284 activates an alarm and a query task 286 determines whether an additional generator 50 is available for use in equalization. If an additional generator 50 is not available, such as when all available generators are already activated to supply power for electrical load 26, then program control passes back to task 272. Task 272 will identify the current equalizing power block 22 as the next equalizing power block, and program control will eventually return to process 202 (FIG. 2) with master controller 34 operating in the normal mode. Equalization for this power block 22 will be attempted again at the completion of the next recharge cycle.

When task 286 finds that another generator 50 is available to be brought on-line for equalization, then task 288 is performed. Task 288 temporarily lowers the next start point 156 in set-point table 150 (FIG. 7) so that background process 148 will activate the next generator 50. Following task 288, program control loops back to task 266 to continue equalization. When equalization is eventually complete, task 272 will restore the altered start point 156 and identify another power block 22 as the next power block to receive equalization. Program control will eventually return to process 202 (FIG. 2) with master controller 34 operating in the normal mode.

In summary, the present invention provides an improved expandable hybrid electric generating system and method. The hybrid electric generating system achieves improved reliability due to a modular approach that allows power blocks to fault without faulting the entirety of the system. In addition, the master controller can fault and at least a subset of its functions taken on by an external supervisor. Since the DC busses of the power block modules are not interconnected, the DC busses operate independently, only a small amount of DC switchgear is used, and costs are reduced. Battery charge cycles are minimized by maintaining the states of the independent DC busses approximately equal during normal and recharging modes of operation. The minimization of battery charge cycles extends battery life and reduces costs. Any number of nearly identical power block modules may be used in the system. The use of nearly identical power blocks permits factory, rather than on-site, manufacture and test of the power blocks, again reducing costs. Moreover, the system can be expanded and maintained with only a small amount of skilled labor cost, yet again reducing costs.

Although the preferred embodiments of the present invention have been illustrated and described in detail, it will be readily apparent to those skilled in the art that various modifications and equivalents may be made therein without departing from the spirit of the invention or from the scope of the appended claims. As but one example, the sequencing and grouping of activities into tasks, sub-processes and processes described herein can be easily varied to a great degree by those skilled in the art without departing from the spirit of the present invention.

What is claimed is:

1. An expandable hybrid electric power generating system comprising:
    an AC bus configured to supply electrical power to an electrical load;
    a plurality of power blocks wherein each of said power blocks has a DC energy source coupled to a DC bus of said power block, and an inverter coupled to said DC bus of said power block and to said AC bus; and a controller in communication with said power blocks, said controller being configured to provide instructions to said power blocks which cause said power blocks to maintain approximately equal states at said DC busses of said power blocks.

2. An expandable hybrid electric power generating system as claimed in claim 1 wherein:

said DC energy source in each of said power blocks includes a battery;

said inverters of said power blocks are configured to selectively transfer power from said AC bus to said DC busses of said power blocks and to transfer power from said DC busses of said power blocks to said AC bus;

said controller is configured to determine, when said inverters are transferring power from said DC busses to said AC bus, if a difference between an electrical load share for one of said power blocks and an average electrical load share for all of said power blocks is greater than a first predetermined amount, and to disable one of said power blocks from supplying power to said AC bus if said load share difference is greater than said first predetermined amount;

said controller is further configured to determine, when said inverters are transferring power from said AC bus to said DC busses, if a difference between an electrical charge share for one of said power blocks and an average electrical charge share for all of said power blocks is greater than a second predetermined amount, and to disable one of said power blocks from supplying power to said AC bus if said charge share difference is greater than said second predetermined amount; and said controller is further configured to equalize said battery of one of said plurality of power blocks using electrical power supplied from said others of said power blocks.

3. An expandable hybrid electric power generating system as claimed in claim 2 additionally comprising:

an external supervisor in communication with said plurality of power blocks, said external supervisor being configured to respond to a power outage at said AC bus which exceeds a predetermined duration by controlling operation of said plurality of power blocks;

a first power supply for energizing said controller; and a second power supply for energizing said external supervisor.

4. An expandable hybrid electric power generating system as claimed in claim 1 additionally comprising an AC generator located in each of said plurality of power blocks, said AC generators being coupled to said AC bus.

5. An expandable hybrid electric power generating system comprising:

an AC bus configured to supply electrical power to an electrical load;

a first power block having a first DC energy source coupled to a first DC bus, a first inverter coupled to said first DC bus and to said AC bus, and a generator coupled to said AC bus;

a second power block having a second DC energy source coupled to a second DC bus, and a second inverter coupled to said second DC bus and to said AC bus; and a controller in signal communication with said first and second DC busses and said first and second inverters, said controller being configured to maintain approximately equal states at said first and second DC busses.

6. An expandable hybrid electric power generating system as claimed in claim 5 additionally comprising a plurality of DC energy sources coupled to one of said first and second DC busses.

7. An expandable hybrid electric power generating system as claimed in claim 5 wherein:

said system additionally comprises a third power block having a third DC energy source coupled to a third DC bus, and a third inverter coupled to said third DC bus and to said AC bus;

said controller is in signal communication with said third DC bus and said third inverter; and said controller is configured to maintain approximately equal states among said first, second and third DC busses.

8. An expandable hybrid electric power generating system as claimed in claim 5 wherein:

said controller is configured to determine if a difference between an electrical load share for one of said power blocks and an average electrical load share for all of said power blocks is greater than a predetermined amount; and said controller is further configured to activate an alarm if said difference is greater than said predetermined amount.

9. An expandable hybrid electric power generating system as claimed in claim 5 wherein:

said controller is configured to determine if a difference between an electrical load share for one of said power blocks and an average electrical load share for all of said power blocks is greater than a predetermined amount; and said controller is further configured to disable said one power block from supplying power to said AC bus if said difference is greater than said predetermined amount.

10. An expandable hybrid electric power generating system as claimed in claim 5 wherein:

said controller is configured to monitor said electrical load; and said controller is configured to control enabled and disabled states of said generator for supplying power to said AC bus in response to said electrical load.

11. An expandable hybrid electric power generating system as claimed in claim 10 wherein:

said generator is a first generator;

said second power block has a second generator coupled to said AC bus;

said controller is configured so that when said electrical load is less than a first threshold, neither of said first and second generators is enabled to supply power to said AC bus;

said controller is configured so that when said electrical load is greater than said first threshold and less than a second threshold, one of said first and second generators is enabled to supply power to said AC bus; and said controller is configured so that when said electrical load is greater than said second threshold, both of said first and second generators are enabled to supply power to said AC bus.

12. An expandable hybrid electric power generating system as claimed in claim 11 wherein:

said first and second inverters are configured to permit power flow from said respective first and second DC busses to said AC bus for supplying power to said electrical load and to permit power flow from said AC bus to said respective first and second DC busses for charging said first and second DC energy sources; and said first and second thresholds are different values when power flows from said first and second DC busses to said AC bus than when power flows from said AC bus to said first and second DC busses.

13. An expandable hybrid electric power generating system as claimed in claim 5 wherein:
    said controller receives signals indicating instantaneous voltages on said first DC bus and on said second DC bus; and
    said controller is configured to filter said signals so that said first and second DC busses are maintained at approximately equal states in response to filtered instantaneous voltage states of said first and second DC busses.

14. An expandable hybrid electric power generating system as claimed in claim 5 wherein said first and second inverters are configured to adjust power flow from said respective first and second DC busses to said AC bus independent of said electrical load and in response to commands issued by said controller to maintain approximately equal states at said first and second DC busses.

15. An expandable hybrid electric power generating system as claimed in claim 5 wherein said first and second inverters are configured to transfer power from said AC bus to said respective first and second DC busses to charge said first and second DC energy sources.

16. An expandable hybrid electric power generating system as claimed in claim 15 wherein:
    said first DC energy source is a battery; and
    said controller is configured to equalize said battery using electrical power supplied from said second power block.

17. An expandable hybrid electric power generating system as claimed in claim 15 wherein said first and second inverters are configured to adjust power flow from said AC bus to said first and second DC busses independent of loads on said first and second DC busses and in response to commands issued by said controller to maintain approximately equal states at said first and second DC busses.

18. An expandable hybrid electric power generating system as claimed in claim 17 wherein:
    said controller is configured to determine if a difference between a charging share of one of said power blocks and an average charging share for all of said power blocks is greater than a predetermined amount; and
    said controller is further configured to activate an alarm if said difference is greater than said predetermined amount.

19. An expandable hybrid electric power generating system as claimed in claim 17 wherein:
    said controller is configured to determine if a difference between a charging share of one of said power blocks and an average charging share for all of said power blocks is greater than a predetermined amount; and
    said controller is further configured to disable said one power block from supplying power to said AC bus if said difference is greater than said predetermined amount.

20. An expandable hybrid electric power generating system as claimed in claim 19 wherein said controller is configured to disable said one power block if said charging share is greater than said predetermined amount during a charging cycle but refrains from disabling said power block due to greater charging share during an absorbing cycle.

21. An expandable hybrid electric power generating system as claimed in claim 5 additionally comprising an external supervisor in communication with said first and second power blocks, said external supervisor being configured to respond to a power outage at said AC bus which exceeds a predetermined duration by controlling operation of said first and second power blocks.

22. An expandable hybrid electric power generating system as claimed in claim 5 additionally comprising an external supervisor in communication with said controller, said external supervisor being configured to control operation of said power blocks in response to a fault in said controller.

23. An expandable hybrid electric power generating system as claimed in claim 22 additionally comprising:
    a first power supply for energizing said controller; and
    a second power supply for energizing said external supervisor.

24. An expandable hybrid electric power generating system as claimed in claim 22 wherein said external supervisor is configured to disable said first and second power blocks from supplying power to said AC bus when said fault in said controller occurs.

25. An expandable hybrid electric power generating system as claimed in claim 24 wherein said external supervisor is configured to enable said first and second generators to provide power to said AC bus after disabling said first and second power blocks from supplying power to said AC bus.

26. A method of controlling an expandable hybrid electric power generating system having an AC bus configured to supply electrical power to an electrical load and a plurality of modular power blocks, wherein power block has a DC energy source coupled to a DC bus for that power block, and an inverter coupled to said DC bus and to said AC bus, and said method comprises:
    receiving, at a controller, monitoring signals which describe states of said DC busses in said power blocks; and
    sending adjustment instructions to said plurality of power blocks from said controller, said adjustment instructions being configured to maintain approximately equal states at said DC busses in said power blocks.

27. A method as claimed in claim 26 additionally comprising:
    determining if a difference between an electrical load share for one of said power blocks and an average electrical load share for all of said power blocks is greater than a predetermined amount; and
    activating an alarm if said difference is greater than said predetermined amount.

28. A method as claimed in claim 26 additionally comprising:
    determining if a difference between an electrical load share for one of said power blocks and an average electrical load share for all of said power blocks is greater than a predetermined amount; and
    disabling said one power block from supplying power to said AC bus if said difference is greater than said predetermined amount.

29. A method as claimed in claim 26 wherein each of said power blocks additionally has an AC generator coupled to said AC bus, said method additionally comprising:

monitoring said electrical load; and controlling enabled and disabled states of said first and second generators for supplying power to said AC bus in response to said electrical load.

30. A method as claimed in claim 26 wherein:

said electrical load undergoes instantaneous changes; and said adjustment instructions are substantially non-responsive to said instantaneous changes.

31. A method as claimed in claim 26 wherein:

said DC energy sources of said power blocks are batteries;

said inverters of said plurality of power blocks are configured to selectively transfer power from said AC bus to respective DC busses of said power blocks to charge said respective batteries of said power blocks; and said method additionally comprises equalizing one of said batteries of said plurality of power blocks using electrical power supplied from others of said power blocks.

32. A method as claimed in claim 26 wherein:

said inverters of said plurality of power blocks are configured to selectively transfer power from said AC bus to respective DC busses of said power blocks to charge said respective DC energy sources of said power blocks;

said sending activity maintains approximately equal states at said DC busses of said power blocks while power flows from said DC busses to said AC bus; and said method additionally comprises sending charging adjustment instructions to said plurality of power blocks, said charging adjustment instructions being configured to maintain approximately equal states at said DC busses in said power blocks while power flows from said AC bus to said DC busses.

\* \* \* \* \*

UNITED STATES PATENT AND TRADEMARK OFFICE
CERTIFICATE OF CORRECTION

PATENT NO. : 6,362,540 B1
DATED : March 26, 2002
INVENTOR(S) : Bryan T. Hill

It is certified that error appears in the above-identified patent and that said Letters Patent is hereby corrected as shown below:

Column 5,
Line 4, replace "241" with -- 24' --.

Signed and Sealed this

Twenty-second Day of October, 2002

Attest:

Attesting Officer

JAMES E. ROGAN
Director of the United States Patent and Trademark Office